United States Patent
Liu

(10) Patent No.: US 9,785,190 B2
(45) Date of Patent: Oct. 10, 2017

(54) VIRTUAL REALITY GLASSES

(71) Applicant: Beijing Pico Technology Co., Ltd., Beijing (CN)

(72) Inventor: Guanghui Liu, Beijing (CN)

(73) Assignee: Beijing Pico Technology Co., Ltd. (CN)

( * ) Notice: Subject to any disclaimer, the term of this patent is extended or adjusted under 35 U.S.C. 154(b) by 0 days.

(21) Appl. No.: 15/254,166

(22) Filed: Sep. 1, 2016

(65) Prior Publication Data
US 2017/0115689 A1   Apr. 27, 2017

(30) Foreign Application Priority Data
Oct. 21, 2015 (CN) .................... 2015 2 0818264 U

(51) Int. Cl.
| | | |
|---|---|---|
| G06F 1/16 | (2006.01) | |
| G06F 3/01 | (2006.01) | |
| G02B 27/01 | (2006.01) | |

(52) U.S. Cl.
CPC .......... *G06F 1/163* (2013.01); *G02B 27/017* (2013.01); *G06F 1/1605* (2013.01); *G06F 1/169* (2013.01); *G06F 1/1632* (2013.01); *G06F 1/1635* (2013.01); *G06F 1/1637* (2013.01); *G06F 1/1662* (2013.01); *G06F 1/1694* (2013.01); *G06F 1/1698* (2013.01); *G06F 3/011* (2013.01)

(58) Field of Classification Search
CPC ...... G06F 1/163; G06F 1/1637; G06F 1/1698; G06F 1/1605; G06F 1/1632; G06F 1/1694; G06F 1/1662; G06F 1/1635; G06F 1/169; G06F 3/011; G02B 27/017
See application file for complete search history.

(56) References Cited

U.S. PATENT DOCUMENTS 9,176,325 B2 * 11/2015 Lyons ................ G02B 27/0172

* cited by examiner

*Primary Examiner* — Larry Sternbane
(74) *Attorney, Agent, or Firm* — Taylor English Duma LLP

(57) ABSTRACT

A virtual reality glasses is disclosed, comprising a main control handle and a head-mounted device comprising a video processing interface unit, a controller, a USB interface and a video interface, the USB interface's power line supplies power to a power-consuming part of the device via a power converting unit, USB differential signal pins of the USB interface are connected to the controller, the video interface is connected to a display module via the video processing interface unit; the main control handle comprises an application processor, a power unit, and a USB interface and a video interface connected to the processor, and the power unit supplies power to a power-consuming part of the handle. The glasses can improve portability and enhance user experience.

20 Claims, 2 Drawing Sheets

VIRTUAL REALITY GLASSES

CROSS-REFERENCE TO RELATED APPLICATIONS

This application claims priority to Chinese Patent Application No. 201520818264.8 filed on Oct. 21, 2015, the entire disclosure of which is hereby specifically and entirely incorporated by reference.

FIELD OF THE INVENTION

The present invention relates to the field of virtual reality (VR) technologies, and particularly to a VR glasses.

BACKGROUND OF THE INVENTION

Traditional VR glasses mainly include two types. One type of VR glasses is based on computers or gaming machines. This type of VR glasses acquires input sources from computers or gaming machines, and may be exemplified by Oculus VR glasses. The other type of VR glasses is based on Samsung cell phones. That is, Samsung cell phones are inserted into head-mounted parts of the glasses so that input sources can be acquired from Samsung cell phones. The first type of VR glasses has the problem of poor portability and inconvenient carrying for users. The second type of VR glasses has the problem of heavy weight and excessive heat generation of the head-mounted parts, so that it is uncomfortable for users to wear such glasses. Therefore, there is a need to improve the structure of VR glasses to enhance user experience.

SUMMARY OF THE INVENTION

An objective of the present invention is to provide a virtual reality glasses with high portability and wearing comfort.

According to a first aspect of the present utility model, there is provided a virtual reality glasses comprising a head-mounted device and a main control handle, wherein the head-mounted device comprises a video processing interface unit, an audio processing unit, a controller, a power converting unit, a display module, a headphone socket, a head-mounted side USB interface and a head-mounted side video interface, a power line of the head-mounted side USB interface supplies power to a power-consuming part of the head-mounted device via the power converting unit, USB differential signal pins of the head-mounted side USB interface are connected to the controller, the head-mounted side video interface is connected to the display module via the video processing interface unit; an audio signal output end of the controller is connected to an audio signal input interface of the audio processing unit, a headphone interface of the audio processing unit is connected to the headphone socket; the main control handle comprises an application processor, a power unit, a storage unit connected to the application processor, a handle side input unit connected to the application processor, a handle side USB interface corresponding to the head-mounted side USB interface and connected to the application processor, and a handle side video interface corresponding to the head-mounted side video interface and connected to the application processor, wherein the power unit supplies power to a power-consuming part of the main control handle.

Preferably, the main control handle further comprises a Bluetooth module and/or a WIFI module, the Bluetooth module and/or the WIFI module being connected to the application processor.

Preferably, in addition to the handle side USB interface, the main control handle further comprises at least one USB interface connected to the application processor.

Preferably, the storage unit comprises at least one of an embedded memory, a double data rate synchronous dynamic random access memory and a memory card holder.

Preferably, the handle side USB interface and the handle side video interface are provided by a handle side Type-C interface, and the head-mounted side USB interface and the head-mounted side video interface are provided by a head-mounted side Type-C interface.

Preferably, the handle side input unit comprises a key input unit and/or a touch control input unit.

Preferably, the head-mounted device further comprises a microphone connected to a microphone interface of the audio processing unit, and an audio signal output interface of the audio processing unit is connected to an audio signal input end of the controller.

Preferably, the head-mounted device further comprises a posture sensor unit, a posture signal output end of the posture sensor unit being connected to the controller; the posture sensor unit comprises at least one of a triaxial gyroscope, a triaxial acceleration sensor and a triaxial magnetic induction sensor.

Preferably, the head-mounted device further comprises a proximity sensor, a signal output end of the proximity sensor being connected to the controller.

Preferably, the head-mounted device further comprises a head-mounted side input unit connected to the controller and comprising a key input unit and/or a touch control input unit.

One advantageous effect of the present invention is that user experience can be enhanced remarkably. The VR glasses of the present invention include a main control handle and a head-mounted device that are separately configured. The portable main control handle provides input sources such as video and games to the head-mounted device using USB interfaces and video interfaces, so that the VR glasses of the present invention are portable. In addition, the power unit is provided in the main control handle, which supplies power to the head-mounted device using a USB interface, so that little heat will be generated by the head-mounted device, thereby improving wearing comfort for users.

BRIEF DESCRIPTION OF THE DRAWINGS

The drawings that are integrated into the description and constitute a part of the description show the embodiments of the present invention and are intended to explain the principle of the invention together with the descriptions thereof.

Figure 1:
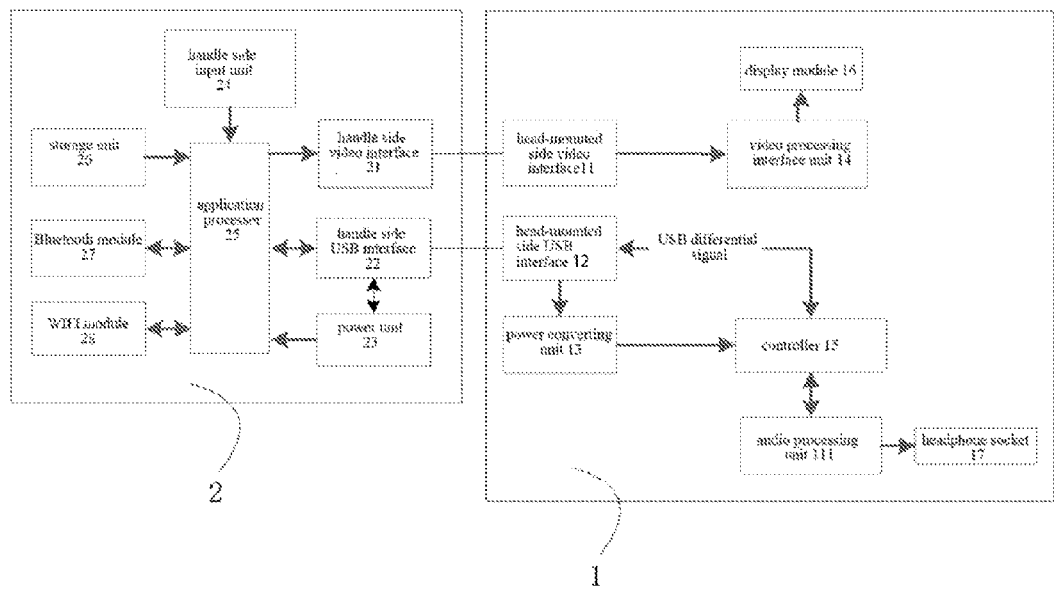
FIG. 1 is a schematic block view of an embodiment of a VR glasses according to the present utility model.

Explanation for the reference signs in the drawings: 1—head-mounted device; 11—head-mounted side video interface; 12—head-mounted side USB interface;

13—power converting unit; 14—video processing interface unit; 15—controller; 16—display module; 17—headphone socket; 18—interface controller; 19—switching unit; 110—head-mounted side Type-C interface; 111—audio processing unit; 112—microphone; 2—main control handle; 21—handle side video interface; 22—handle side USB interface; 23—power unit; 24—handle side input unit; 25—application processor; 26—storage unit; 27—Bluetooth module; 28—WIFI module; K11~K15—first to fifth regular plugging switch passages; K21~K25—first to fifth inverse plugging switch passages.

DETAILED DESCRIPTION OF THE EMBODIMENTS

Now, various embodiments of this invention will be described in detail with reference to the drawings. It should be noted that, unless specified otherwise, the arrangements of the members and steps, the mathematical formulas and numerical values described in these embodiments do not restrict the scope of the utility model.

The following descriptions for at least one embodiment are actually descriptive only, and shall not be intended to limit the invention and any application or use thereof.

The techniques, methods and devices well known to those skilled in the related arts may not be discussed in detail. However, where applicable, such techniques, methods and devices should be deemed as a part of the description.

Any specific value shown herein and in all the examples should be interpreted as illustrative only rather than restrictive. Therefore, other examples of the embodiments may include different values.

It should be noted that similar signs and letters in the following drawings represent similar items. Therefore, once defined in one drawing, an item may not be further discussed in the followed drawings.

The present invention provides a VR glasses with high portability and wearing comfort to solve the problem of poor portability or lower wearing comfort in existing VR glasses. As shown in FIG. 1, the VR glasses comprise a head-mounted device 1 and a main control handle 2. The head-mounted device 1 comprises a video processing interface unit 14, an audio processing unit 111, a controller 15, a power converting unit 13, a display module 16, a head-mounted side USB interface 12, a head-mounted side video interface 11 and a headphone socket 17. A power line (namely, the VBUS and GND wires) of the head-mounted side USB interface 12 supplies power to a power-consuming part of the head-mounted device 1 via the power converting unit 13. The power-consuming part of the head-mounted device 1 comprises the video processing interface unit 14 and the controller 15 and the like. That is, the power converting unit 13 configured to convert a 5V voltage supplied by the power line into the working voltage required by the video processing interface unit 14 and the controller 15. USB differential signal pins of the head-mounted side USB interface 12 are connected to the controller 15. The head-mounted side video interface 11 is connected to the display module 16 via the video processing interface unit 14 so that videos and images can be displayed on the display module 16. An audio signal output end of the controller 15 is connected to an audio signal input interface of the audio processing unit 111. A headphone interface of the audio processing unit 111 is connected to the headphone socket 17, so that audio data can be played by a headphone inserted into the headphone socket 17. That is, the audio processing unit 111 includes an audio decoding module. The main control handle 2 comprises an application processor (AP) 25, a power unit 23, a storage unit 26 connected to the application processor 25, a handle side input unit 24 connected to the application processor 25, a handle side USB interface 22 corresponding to the head-mounted side USB interface 12 and connected to the application processor 25, and a handle side video interface 21 corresponding to the head-mounted side video interface 11 and connected to the application processor 25, wherein the power unit 23 supplies power to a power-consuming part of the main control handle 2. The power-consuming part of the main control handle 2 mainly includes the application processor 25 and the handle side USB interface 22. The power unit 23, similar to a convention power unit, mainly includes batteries and a power management module. The power management module is mainly responsible for charging and discharging management of the batteries, and power amount detection and display.

When using the VR glasses of the present utility model, it only needs to connect the head-mounted side video interface 11 to the handle side video interface 21 via a data line, and connect the head-mounted side USB interface 12 to the handle side USB interface 22 via a data line. In this way, the head-mounted device 1 can acquire input sources and power from the main control handle 2. The input sources are stored in the storage unit 26 of the main control handle 2. The video interfaces 11, 21 include but are not limited to HDMI interfaces, MHL interfaces, DP interfaces and EDP interfaces. Thus, in the VR glasses of the present utility model, the main control handle 2 supplies input sources such as videos and games to the head-mounted device 1, so that the VR glasses are highly portable. In addition, as the power unit 23 is provided in the main control handle 2 and supplies power to the head-mounted device 1 via USB interfaces, the head-mounted device 1 will generate less heat, thereby enhancing wearing comfort for users. In conclusion, the VR glasses of the present invention can remarkably enhance user experience. Further, in the VR glasses of the present utility model, as the application processor 25 of the main control handle 2 can provide decoding and descrambling processes, videos and images can be played by the display module 16 only by providing the video processing interface unit 14 at the head-mounted device 1 for performing simple processing such as interface conversion and/or format conversion.

To exchange data wirelessly between the main control handle 2 and an external terminal, in an embodiment of this invention as shown in FIG. 1, the main control handle 2 further comprises a Bluetooth module 27 and/or a WIFI module 28, the Bluetooth module 27 and/or the WIFI module 28 being connected to the application processor 25 via a PCI-e bus, for example.

To exchange data wirelessly between the main control handle 2 and an external terminal, in an embodiment of this utility model, in addition to the handle side USB interface 22, the main control handle 2 further comprises at least one USB interface connected to the application processor 25, wherein the at least one USB interface preferably employs a USB3.0 interface to improve the data transmission speed between the main control handle 2 and the external terminal.

The storage unit 26 comprises at least one of an embedded memory, a double data rate synchronous dynamic random access memory and a memory card holder. Preferably, the storage unit 26 comprises an embedded memory, a double data rate synchronous dynamic random access memory and a memory card holder. The application processor 25 of the main control handle 2 may be connected to an external memory card such as an SD card via the memory card holder.

The handle side input unit 24 comprises a key input unit and/or a touch control input unit. Keys of the key input unit and a touch control panel of the touch control input unit are exposed via the housing of the main control handle 2, and can allow users to input various operation commands.

Figure 2:
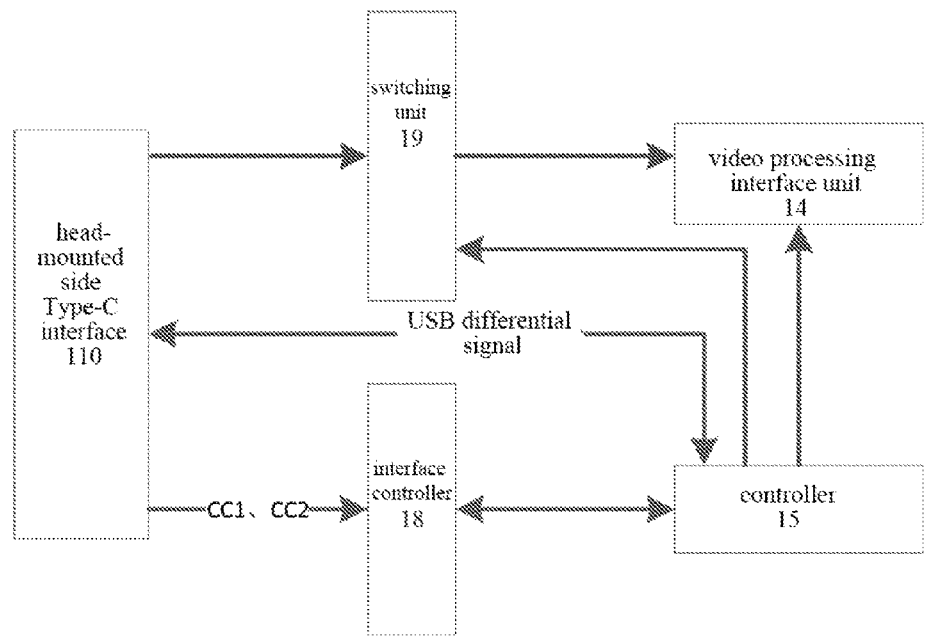
FIG. 2 is a schematic block view of a head-mounted device according to another embodiment of a VR glasses of the present utility model.

To improve compatibility of the VR glasses with various video formats and reduce data lines between the main control handle 2 and the head-mounted device 1, in an embodiment of this invention as shown in FIG. 2, the handle side USB interface 22 and the handle side video interface 21 are provided by a handle side Type-C interface, and correspondingly, the head-mounted side USB interface 12 and the head-mounted side video interface 11 are provided by a head-mounted side Type-C interface 110. That is, video data and USB differential signals can be transmitted by one Type-C interface, i.e. only one data line is needed between the main control handle 2 and the head-mounted device 1, thereby simplifying users' operations.

Figure 4:
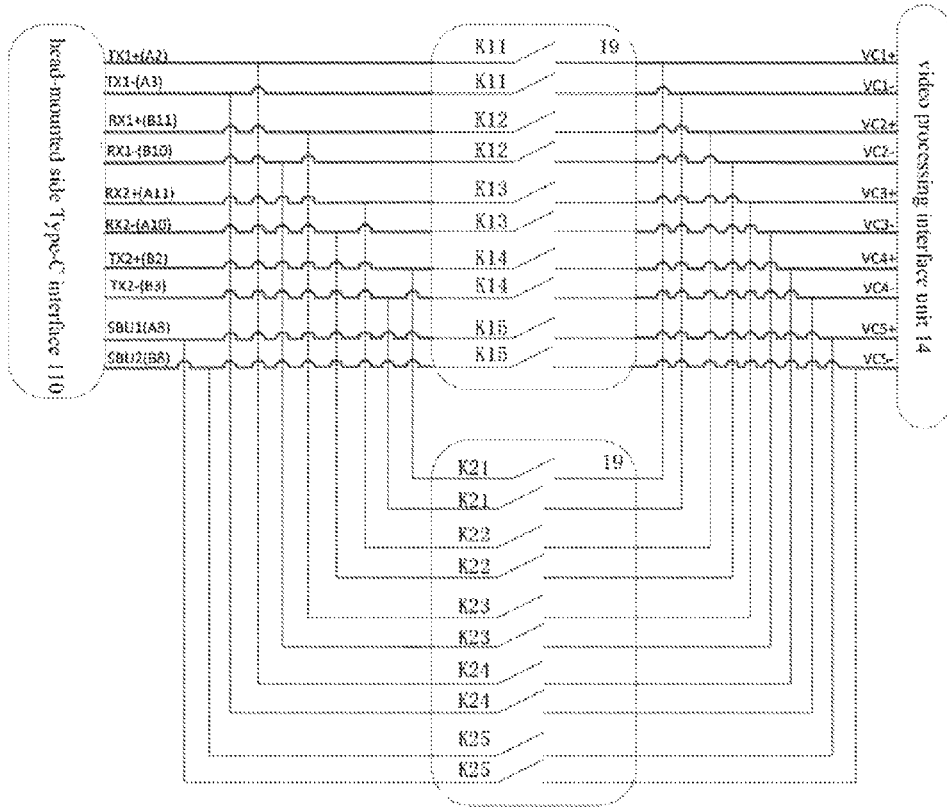
FIG. 4 shows a structure of a Type-C interface connected to a video processing interface unit via a switching unit.

In an embodiment in which a Type-C interface is used, as the most prominent feature of a Type-C interface is that it allows "both regular and inverse plugging", if the VR glasses of the present invention need to support this function, the head-mounted device 1 should further comprise an interface controller 18 and a switching unit 19, as shown in FIG. 2. An example is given in which the configuration at the head-mounted device 1 side is described, and the main control handle 2 may be configured with reference to the head-mounted device 1. For easier understanding, a Type-C interface is briefly introduced. A Type-C interface includes an A face and a B face, each face having 12 pins, the configuration of which is shown in Table 1.

ential signal pin of the video processing interface unit 14 is connected to a video differential signal pin of a Type-C interface via an independent inverse plugging switch passage according to an inverse plugging corresponding relation. In an embodiment of this invention as shown in FIG. 4, the first pair of video differential signal pins VC1+ and VC1− of the video processing interface unit 14 are connected to the TX1+ and TX1− pins via a first regular plugging switch passage K11 respectively, and to the TX2+ and TX2− pins via a first inverse plugging switch passage K21 respectively; the second pair of video differential signal pins VC2+ and VC2− of the video processing interface unit 14 are connected to the RX1+ and RX1− pins via a second regular plugging switch passage K12 respectively, and to the RX2+ and RX2− pins via a second inverse plugging switch passage K22 respectively; the third pair of video differential signal pins VC3+ and VC3− of the video processing interface unit 14 are connected to the RX2+ and RX2− pins via a third regular plugging switch passage K13 respectively, and to the RX1+ and RX1− pins via a third inverse plugging switch passage K23 respectively; the fourth pair of video differential signal pins VC4+ and VC4− of the video processing interface unit 14 are connected to the TX2+ and TX2− pins via a fourth regular plugging switch passage K14 respectively, and to the TX1+ and TX1− pins via a fourth inverse plugging switch passage K24 respectively; the fifth pair of video differential signal pins VC5+ and VC5− of the video processing interface unit 14 are connected to the SBU1 and SBU2 pins via a fifth regular plugging switch passage K15 respectively, and to the SBU2 and SBU1 pins via a fifth inverse plugging switch passage K25 respectively.

In an embodiment in which a Type-C interface is used, the controller 15 includes a USB connector, which can transmit data with the main control handle via the Type-C interface

TABLE 1

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1− | VBUS | CC1 | D+ | D− | SBU1 | VBUS | RX2− | RX2+ | GND |
| GND | RX1+ | RX1− | VBUS | SBU2 | D− | D+ | CC2 | VBUS | TX2− | TX2+ | GND |
| B1 | B2 | B3 | B4 | B5 | B6 | B7 | B8 | B9 | B10 | B11 | B12 |

TX1+ and TX1−, RX1+ and RX1−, TX2+ and TX2−, RX2+ and RX2− are four pairs of differential signal pins, GND are grounding pins, D+ and D− are USB differential signal pins compatible with the USB2.0 protocol, VBUS is a power pin, CC1 and CC2 are pins for detecting regular plugging and inverse plugging and a plugged terminal type; SBU1 and SBU2 are second bus pins. The above four pairs of differential signal pins and one pair of second bus pins can be used as the five pairs of video differential signal pins of a Type-C interface.

The interface controller 18 is configured to determine if a Type-C line is regularly plugged or inversely plugged with respect to a Type-C interface and determine a type of the plugged terminal based on the Type-C protocol. The type of the plugged terminal can be used to determine a format of a transmitted video. Therefore, the interface controller 18 is connected to the CC1 and CC2 pins via two detection signal input pins respectively.

In an embodiment in which a Type-C interface is used, the video processing interface unit 14 may include five pairs of video differential signal pins. Each video differential signal pin of the video processing interface unit 14 is connected to a video differential signal pin of a Type-C interface via an independent regular plugging switch passage according to a regular plugging corresponding relation. Each video differusing the USB2.0 transmission protocol. Therefore, one pair of USB differential signal pins of the USB connector are connected to two pairs of USB differential signal pins of the Type-C interface; that is, one pair of USB differential signal pins of the USB connector are connected to the D+ and D− pins of the Type-C interface. In addition, the controller 15 is in communication connection with the interface controller 18 so as to acquire plugging direction information and type information of the plugged terminal. The interface controller 18 is in communication connection with the video processing interface unit 14, so that the video processing interface unit 14 can determine a protocol for developing a received video signal based on the type information of the plugged terminal. The regular plugging switch signal output pins of the controller 15 are connected to the control ends of all the regular plugging switch passages K11, K12, K13, K14 and K15, such that when the plugging direction information indicates that a Type-C line is regularly plugged into the Type-C interface, all the regular plugging switch passages K11, K12, K13, K14 and K15 are controlled to switch on, and when the plugging direction information indicates that a Type-C line is inversely plugged into the Type-C interface, all the regular plugging switch passages K11, K12, K13, K14 and K15 are controlled to switch off. The inverse plugging switch signal output pins of the controller 15 are connected to the control ends of all the inverse plugging switch passages K21, K22, K23, K24 and K25, such that when the plugging direction information indicates that a Type-C line is regularly plugged into the Type-C interface, all the inverse plugging switch passages K21, K22, K23, K24 and K25 are controlled to switch off, and when the plugging direction information indicates that a Type-C line is inversely plugged into the Type-C interface, all the inverse plugging switch passages K21, K22, K23, K24 and K25 are controlled to switch on. Thus, by controlling the switching unit 19 by the controller 15, no matter if the Type-C line is regularly or inversely plugged into the Type-C interface, the respective pairs of video differential signal pins of the video processing interface unit 14 can be connected to fixed pins of the Type-C interface; in other words, the corresponding relations among the signals transmitted by the Type-C line and the video differential signal pins are kept unchanged.

Since transmission of five pairs of video differential signals can be transmitted at most between the Type-C interface and the video processing interface unit 14 in this utility model, this invention can meet transmission requirements for video signals in various formats, including the HDMI format, the MHL format, even the DP format and the EPD format that include the most differential signal channels, so that compatibility of the VR glasses of this invention can be improved. In addition, as a Type-C interface has a higher transmission rate, if a display module with a high resolution and a high update rate is connected to the video processing interface unit 14, images of higher definitions and more smooth display effects can be acquired.

Figure 3:
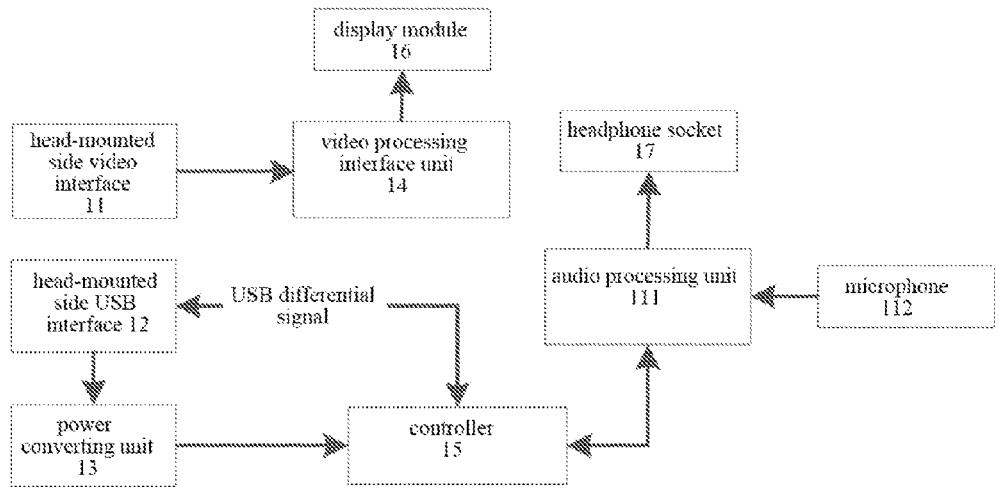
FIG. 3 is a schematic block view of a head-mounted device of a third embodiment of a VR glasses according to the present utility model.

To enable voice communication via the audio processing unit 111 of the VR glasses of this utility model, in an embodiment of this invention as shown in FIG. 3, the head-mounted device 1 further comprises a microphone 112 connected to a microphone interface of the audio processing unit 111, and an audio signal output interface of the audio processing unit 111 is connected to an audio signal input end of the controller 15. That is, the audio processing unit 111 includes an audio encoding module, which packages a sound signal received by the microphone into a standard USB Audio protocol and transmits it to the controller 15 so that the controller 15 transmits it to the main control handle 2 through the USB2.0 protocol.

To enhance the VR experience for the VR glasses of this utility model, in an embodiment of this utility model, the head-mounted device 1 further comprises a posture sensor unit. A posture signal output end of the posture sensor unit is connected to the controller 15, so that the controller 15 can receive a posture signal from the posture sensor unit, track a movement posture of the user, and update the real-time video scene by transmitting the posture signal to the main control handle 2 through the USB2.0 protocol, whereby the movement posture of the user is completely synchronized with the changes of the video scenes, and VR experience can be enhanced. For example, when a user handstands, an image seen in a real environment should be one rotated by 180 degrees. If no posture sensor unit is provided, as the display module of the VR glasses will stand upside down along with the user, the user will see an image the same as the one before the user handstands. By providing a posture sensor unit, when the main control handle 2 detects that the user's head faces downwards, a video scene to be transmitted to the video processing interface unit 14 is adjusted, so that the image seen by the user is rotated by 180 degrees, thereby enhancing the VR. The posture sensor unit comprises at least one of a triaxial gyroscope, a triaxial acceleration sensor and a triaxial magnetic induction sensor. Preferably, the posture sensor unit comprises a triaxial gyroscope, a triaxial acceleration sensor and a triaxial magnetic induction sensor, so as to track a user's movement postures more accurately.

To enhance the VR experience for the VR glasses of this utility model, in an embodiment of this utility model, the head-mounted device 1 further comprises a proximity sensor, a signal output end of the proximity sensor being connected to the controller 15.

To enable information input at the side of the head-mounted device 1 of the VR glasses, in an embodiment of this utility model, the head-mounted device 1 further comprises a head-mounted side input unit connected to the controller 15 and comprising a key input unit and/or a touch control input unit.

The above embodiments mainly focus on the differences relative to other embodiments. Those skilled in the art shall clearly understand that the above embodiments may be applied individually or in combination.

Although specific embodiments of this invention are described in detail through some examples, those skilled in the art shall understand that the above examples are explanatory only and are not intended to limit the scope of the utility model, that modifications can be made to the above embodiments without departing from the scope and spirit of the utility model, and that the scope of the invention is defined by the appended claims.

What is claimed is:

1. Virtual reality glasses comprising:
 a head-mounted device comprising
  a video processing interface unit,
  an audio processing unit comprising
   a headphone interface, and
   an audio signal input interface,
  a controller comprising an audio signal output end connected to the audio signal input interface,
  a power converting unit,
  a display module,
  a headphone socket connected to the headphone interface,
  a head-mounted side USB interface comprising
   a power line supplying power to a power-consuming part of the head-mounted device via the power converting unit, and
   USB differential signal pins connected to the controller, and
  a head-mounted side video interface connected to the display module via the video processing interface unit; and
 a main control handle comprising
  an application processor,
  a power unit configured to supply power to a power-consuming part of the main control handle,
  a storage unit connected to the application processor,
  a handle side input unit connected to the application processor,
  a handle side USB interface corresponding to the head-mounted side USB interface and connected to the application processor, and
  a handle side video interface corresponding to the head-mounted side video interface and connected to the application processor.

2. The virtual reality glasses of claim 1, wherein the head-mounted device further comprises a posture sensor unit, the posture sensor unit comprises:
 a posture signal output end being connected to the controller; and at least one of a triaxial gyroscope, a triaxial acceleration sensor, and a triaxial magnetic induction sensor.

3. The virtual reality glasses of claim 1, wherein the head-mounted device further comprises a proximity sensor, a signal output end of the proximity sensor being connected to the controller.

4. The virtual reality glasses of claim 1, wherein the head-mounted device further comprises:
a head-mounted side input unit connected to the controller; and
at least one of a key input unit and a touch control input unit.

5. The virtual reality glasses of claim 1, wherein the main control handle further comprises at least one of a Bluetooth module and a WIFI module, wherein the at least one of the Bluetooth module and the WIFI module are connected to the application processor.

6. The virtual reality glasses of claim 5, wherein the head-mounted device further comprises a posture sensor unit, the posture sensor unit comprises:
a posture signal output end being connected to the controller; and
at least one of a triaxial gyroscope, a triaxial acceleration sensor, and a triaxial magnetic induction sensor.

7. The virtual reality glasses of claim 5, wherein the head-mounted device further comprises a proximity sensor, a signal output end of the proximity sensor being connected to the controller.

8. The virtual reality glasses of claim 5, wherein the head-mounted device further comprises:
a head-mounted side input unit connected to the controller; and
at least one of a key input unit and a touch control input unit.

9. The virtual reality glasses of claim 1, wherein in addition to the handle side USB interface, the main control handle further comprises at least one USB interface connected to the application processor.

10. The virtual reality glasses of claim 9, wherein the head-mounted device further comprises a posture sensor unit, the posture sensor unit comprises:
a posture signal output end being connected to the controller; and
at least one of a triaxial gyroscope, a triaxial acceleration sensor, and a triaxial magnetic induction sensor.

11. The virtual reality glasses of claim 9, wherein the head-mounted device further comprises a proximity sensor, a signal output end of the proximity sensor being connected to the controller.

12. The virtual reality glasses of claim 9, wherein the head-mounted device further comprises:
a head-mounted side input unit connected to the controller; and
at least one of a key input unit and a touch control input unit.

13. The virtual reality glasses of claim 1, wherein the storage unit comprises at least one of an embedded memory, a double data rate synchronous dynamic random access memory, and a memory card holder.

14. The virtual reality glasses of claim 13, wherein the head-mounted device further comprises:
a posture sensor unit comprising
a posture signal output end being connected to the controller, and
at least one of a triaxial gyroscope, a triaxial acceleration sensor, and a triaxial magnetic induction sensor;
a proximity sensor, a signal output end of the proximity sensor being connected to the controller;
a head-mounted side input unit connected to the controller; and
at least one of a key input unit and a touch control input unit.

15. The virtual reality glasses of claim 1, wherein the handle side USB interface and the handle side video interface are provided by a handle side Type-C interface, and the head-mounted side USB interface and the head-mounted side video interface are provided by a head-mounted side Type-C interface.

16. The virtual reality glasses of claim 15, wherein the head-mounted device further comprises:
a posture sensor unit comprising
a posture signal output end being connected to the controller, and
at least one of a triaxial gyroscope, a triaxial acceleration sensor, and a triaxial magnetic induction sensor;
a proximity sensor, a signal output end of the proximity sensor being connected to the controller;
a head-mounted side input unit connected to the controller; and
at least one of a key input unit and a touch control input unit.

17. The virtual reality glasses of claim 1, wherein the handle side input unit comprises at least one of a key input unit and a touch control input unit.

18. The virtual reality glasses of claim 17, wherein the head-mounted device further comprises:
a posture sensor unit comprising
a posture signal output end being connected to the controller, and
at least one of a triaxial gyroscope, a triaxial acceleration sensor, and a triaxial magnetic induction sensor;
a proximity sensor, a signal output end of the proximity sensor being connected to the controller;
a head-mounted side input unit connected to the controller; and
at least one of a key input unit and a touch control input unit.

19. The virtual reality glasses of claim 1, wherein the head-mounted device further comprises a microphone connected to a microphone interface of the audio processing unit, wherein an audio signal output interface of the audio processing unit is connected to an audio signal input end of the controller.

20. The virtual reality glasses of claim 19, wherein the head-mounted device further comprises:
a posture sensor unit comprising
a posture signal output end being connected to the controller, and
at least one of a triaxial gyroscope, a triaxial acceleration sensor, and a triaxial magnetic induction sensor;
a proximity sensor, a signal output end of the proximity sensor being connected to the controller;
a head-mounted side input unit connected to the controller; and
at least one of a key input unit and a touch control input unit.

* * * * *